(12) United States Patent
Blanc et al.

(10) Patent No.: US 12,428,136 B2
(45) Date of Patent: Sep. 30, 2025

(54) DEVICE AND METHOD FOR GENERATING FLUTTER ON AT LEAST A PART OF AN AIRCRAFT

(71) Applicant: Airbus Operations SAS, Toulouse (FR)

(72) Inventors: Sébastien Blanc, Blagnac (FR); Laura Montironi, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/924,577

(22) Filed: Oct. 23, 2024

(65) Prior Publication Data

US 2025/0136271 A1     May 1, 2025

(30) Foreign Application Priority Data

Oct. 25, 2023    (FR) .................................... 2311568

(51) Int. Cl.
    *B64C 13/50*     (2006.01)
    *B64C 13/16*     (2006.01)
    *B64D 45/00*     (2006.01)

(52) U.S. Cl.
    CPC ............ *B64C 13/503* (2013.01); *B64C 13/16* (2013.01); *B64D 2045/0085* (2013.01)

(58) Field of Classification Search
    CPC ................. B64C 13/503; B64C 13/16; B64D 2045/0085
See application file for complete search history.

(56) References Cited

U.S. PATENT DOCUMENTS

| | | | |
|---|---|---|---|
| 2005/0234606 A1* | 10/2005 | Giazotto | B64C 25/42 701/3 |
| 2012/0310449 A1* | 12/2012 | Hinnant, Jr. | G05D 1/0204 701/1 |
| 2013/0158891 A1* | 6/2013 | Niepokolczycki | G06F 17/142 702/33 |
| 2016/0355278 A1 | 12/2016 | Goodman | |

FOREIGN PATENT DOCUMENTS

EP       3106999 A1    12/2016

OTHER PUBLICATIONS

French Search Report for corresponding French Patent Application No. 2311568 dated Mar. 13, 2024.
(Continued)

*Primary Examiner* — Rodney A Bonnette
(74) *Attorney, Agent, or Firm* — Greer, Burns & Crain, Ltd.

(57) ABSTRACT

A device comprising a plurality of sensors arranged on an aircraft and configured to measure input data, an avionics computer configured to determine, based on the input data, at least one control command for at least one control surface of the aircraft by using a control law comprising at least one gain value, the control law being configured to obtain a control command making it possible to generate a flutter mode on at least a part of the aircraft, and a control system configured to control the control surface of the aircraft so as to generate the flutter mode by using the control command determined by the avionics computer.

9 Claims, 2 Drawing Sheets

(56) References Cited

OTHER PUBLICATIONS

M. W. Kehoe "A Historical Overview of Flight Flutter Testing" retrieved on Oct. 1, 1995 from the Internet: https://ww.wired.com/images_blogs/autopia/2010/03/19960004074_1996104074.pdf, pp. 1-22.

M. Brenner et al., "Overview of Recent Flight Flutter Testing Research at NASA Dryden" 38th Structures, Structural Dynamics, and Materials Conference, retrieved on Mar. 13, 2024 from the Internet: https://ntrs.nasa.gov/api/citations/19970015518/downloads/19970015518.pdf.

\* cited by examiner

DEVICE AND METHOD FOR GENERATING FLUTTER ON AT LEAST A PART OF AN AIRCRAFT

CROSS-REFERENCES TO RELATED APPLICATIONS

This application claims the benefit of French Patent Application Number 2311568 filed on Oct. 25, 2023, the entire disclosure of which is incorporated herein by way of reference.

FIELD OF THE INVENTION

The present invention relates to a device and a method for generating a flutter effect on at least a part of an aircraft.

BACKGROUND OF THE INVENTION

During a flight, an aircraft is subjected to aerodynamic forces which deform its structure. These deformations coupled with the flow of air over the outer surfaces of the aircraft can generate undesirable vibratory effects, notably on the wings. Indeed, for an aircraft speed greater than a critical speed, aeroelastic instabilities appear leading to an oscillation effect called flutter. This flutter effect can be detrimental to the aircraft, which causes its maximum speed to be limited. It is therefore advantageous to have solutions to counter the flutter effect.

One method for eliminating flutter consists in modifying the damping properties of the flexible modes of the aircraft (or at least of some parts thereof) in flight by acting on control surfaces, for example ailerons, flaps or spoilers of the wings, or the vertical stabilizer. This method is developed using simulations and requires its effectiveness to be evaluated in real conditions. For this, a test aircraft is brought into conditions at the limit of the flutter, that is to say at a speed close to its critical speed, so as to check whether the capabilities for increasing the damping make it possible to obtain or not obtain an effective suppression of the flutter.

However, this method is not fully satisfactory. Indeed, bringing an aircraft close to its critical speed presents risks. First of all, that presupposes a strong confidence in the knowledge of the precise critical speed of a given aircraft. In addition, this test method does not make it possible to evaluate the robustness of the flutter suppression, or to evaluate, if necessary, the effectiveness of the self-adaptation algorithms associated with said flutter suppression. Moreover, in the case of unexpected behavior during the test, the sole means for reverting to stable flight conditions is to reduce the speed of the aircraft to move away from the critical speed, which is not instantaneous.

There is therefore a need to find a safer and more extensive solution for testing such a method for suppressing flutter on an aircraft.

SUMMARY OF THE INVENTION

A subject of the present invention is to propose a solution for remedying the abovementioned drawbacks. It relates to a method for generating a flutter effect on at least a part of an aircraft in flight.

According to the invention, the method comprises at least the following series of successive steps, implemented repetitively:

a measuring step, implemented by a plurality of sensors arranged on the aircraft, for measuring input data;

a data processing step, implemented by an avionics computer, for, based on the input data measured in the measuring step, determining at least one control command for at least one control surface of the aircraft, the control command being determined by using a control law comprising at least one adjustable parameter corresponding to a gain value, said control law being configured to obtain a control command making it possible to generate a flutter mode on at least a part of the aircraft; and a control step for controlling the control surface so as to generate said flutter mode by using the control command determined in the data processing step.

Thus, by virtue of the invention, it is possible to generate a flutter mode on a part of the aircraft without needing to approach its critical speed. It is therefore possible to study the behavior of the aircraft when the latter is subjected to a flutter effect, and do so in controlled and safe conditions. Indeed, in the case of an undesirable event in the generation of the flutter, it is sufficient to stop the implementation of the method to almost instantaneously revert to a stable situation for the aircraft.

Advantageously, the method comprises an adjustment step, implemented by an adjustment unit, for adjusting the adjustable parameter or parameters of the control law in real time, so as to obtain a control command for the control surface of the aircraft that makes it possible to generate a predetermined flutter mode.

Furthermore, advantageously, the method comprises a data preprocessing step, implemented by the avionics computer before the data processing step, for calculating an input signal for the control law based on the input data acquired in the acquisition step, by using the following equation:

$$U = \sum_{i=1}^{N}(a_i) - N.a_r \qquad [\text{EQ. 1}]$$

in which:

U is the input signal of the control law;

N is the number of sensors;

$a_i$ is an acceleration measured by one of said sensors; and $a_r$ is an acceleration measured by one of said sensors configured to measure an acceleration linked to a rigid movement of the aircraft.

In a particular embodiment, the method comprises a data post-processing step, implemented by the avionics computer after the data processing step, for applying at least one of the following limitations to the control command determined by the control law: a deployment amplitude limitation, a deployment speed limitation, a delay.

Moreover, advantageously, the control law comprises at least one filtering chain.

In a particular embodiment, the method comprises a monitoring step, implemented by a monitoring unit, for recording the input data measured by the plurality of sensors over time, for comparing said input data to predetermined threshold values, and, if at least one of said input data is greater than said corresponding predetermined threshold value, for inhibiting the deployment of the control surface of the aircraft controlled by the control command.

The present invention relates also to an aircraft comprising a device for generating a flutter effect on at least a part of said aircraft. According to the invention, said device comprises at least:

a plurality of sensors arranged on the aircraft and configured to measure input data;

an avionics computer arranged on the aircraft and configured to determine, based on said input data, at least one control command for at least one control surface of the aircraft, the control command being determined by using a control law comprising at least one adjustable parameter corresponding to a gain value, said control law being configured to obtain a control command making it possible to generate a flutter mode on at least a part of the aircraft; and a control system configured to control said control surface so as to generate said flutter mode by using the control command determined by the avionics computer.

Advantageously, the device comprises an adjustment unit comprising an interactive interface making it possible to adjust the adjustable parameter or parameters of the control law in real time, so as to obtain a control command for the control surface of the aircraft that makes it possible to generate a predetermined flutter mode.

Furthermore, in a particular embodiment, the device comprises a monitoring unit configured to record the input data measured by the plurality of sensors over time, to compare said input data to predetermined threshold values, and, if at least one of said input data is greater than said corresponding predetermined threshold value, to inhibit the deployment of the control surface of the aircraft controlled by the control command.

BRIEF DESCRIPTION OF THE DRAWINGS

The attached figures will give a good understanding as to how the invention can be realized. In these figures, identical references denote similar elements.

DETAILED DESCRIPTION OF THE PREFERRED EMBODIMENTS

Figure 1:
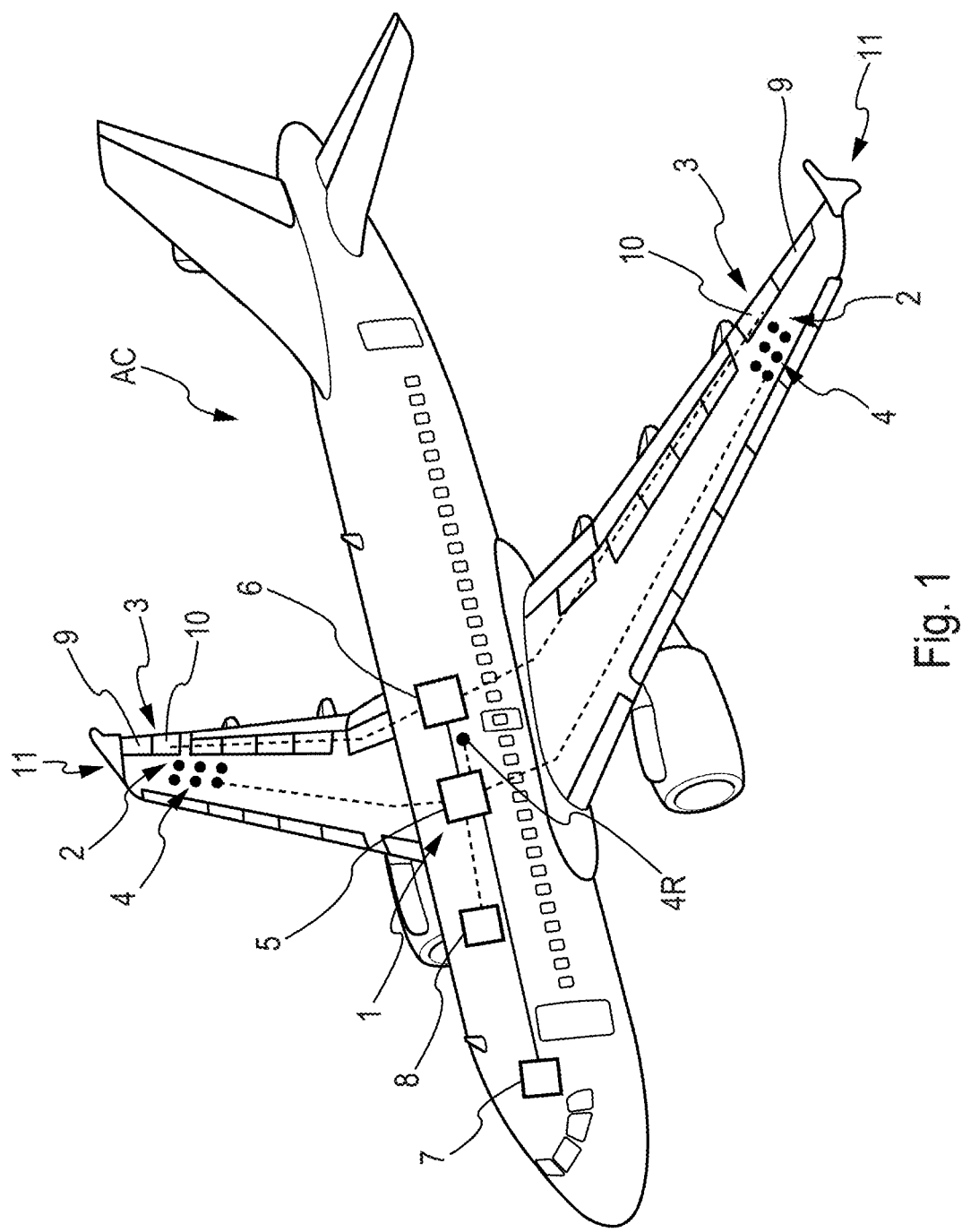
FIG. 1 is a perspective view of an aircraft comprising a device for generating a flutter effect according to a particular embodiment.

The device 1 used to illustrate the invention is represented schematically in a particular embodiment in FIG. 1. It is a device for generating a flutter effect capable of generating flutter over all or part of an aircraft AC, in particular a transport airplane.

"Flutter effect" or "flutter" is understood to mean a vibratory resonance effect caused by an aeroelastic coupling which appears naturally on an aircraft in flight when the latter reaches or exceeds a critical speed which is specific to it and which depends on its design. The aim of the device 1 is to artificially generate (or provoke) the appearance of flutter on the aircraft AC in flight, without needing to exceed or too closely approach its critical speed.

The device 1 is particularly suited to studying the behavior of an aircraft with flutter in controlled conditions. It can, for example, make it possible to test solutions for suppressing or reducing the flutter. That is the object of a preferred application which will be detailed hereinbelow, in which the aircraft AC corresponds to a test aircraft used to evaluate the performance levels of a flutter suppression function. In this preferred application, the device 1 is configured to generate flutter on the aircraft AC in a first stage. Then, in a second stage, a system (not described in detail in the present description), intended to counter this flutter, is tested so as to evaluate its capacity to effectively counter the flutter.

In a particular embodiment, the device 1 is configured to perform measurements on a part 2 of the aircraft AC, on which there is a desire to generate flutter. Based on these measurements, the device 1 can determine a control command for control surfaces 3 of the aircraft AC. The deployment (or displacement) of these control surfaces 3 makes it possible to generate a desired flutter mode on the part 2, as explained hereinbelow.

In the particular embodiment represented in FIG. 1, the part 2 on which there is a desire to generate a flutter corresponds to wings 11 of the aircraft AC. However, in other embodiments, the flutter can be generated on one or more other parts of the aircraft AC, for example on a part of the fuselage or the vertical stabilizer.

The expression "flutter mode" denotes the unstable vibration modes obtained naturally on certain parts of the aircraft AC when the latter exceeds its critical speed. In addition, "naturally obtained" means obtained in normal flight conditions, that is to say without acting on any element of the aircraft AC modifying its structural and aerodynamic properties in order to modify its vibratory response.

The device 1 comprises a plurality of sensors, for example accelerometers 4, arranged on the part 2 of the aircraft AC. Hereinafter in the description, the sensors will be illustrated by accelerometers, but could of course be other types of sensors. The accelerometers 4 are configured to make it possible to measure the vibration modes of the part 2 when the aircraft AC is in flight. More specifically, they are configured to measure the excitation linked to the vibration modes of the part 2, namely the deformations undergone by said part 2 in flight.

The arrangement of the accelerometers 4 is chosen shrewdly such that they can best measure the vibration modes on the part 2, in particular the flutter mode that is wanted to be generated. Since the flutter mode to be generated is targeted beforehand via simulations using aeroelastic models of the aircraft AC, its characteristics are known. Consequently, it is possible to identify the preferred points at which to position the accelerometers 4.

Furthermore, preferably, the accelerometers 4 are arranged in proximity to the control surfaces 3 used to generate the desired flutter mode. That makes it possible to effectively measure the effect produced by the deployment of said control surfaces 3 and improve the effectiveness of the device 1.

The plurality of accelerometers 4 comprises an accelerometer 4R configured to measure an acceleration linked to a particularly rigid movement of the aircraft AC. This acceleration, called rigid acceleration, corresponds to a rigid dynamic component of the overall movement of the aircraft AC in flight. It can be used as a reference as explained below. Preferably, the accelerometer 4R is arranged close to the center of gravity of the aircraft AC or on a zone in which the dynamics are consistent with said center of gravity.

In order to simplify the drawings, only a few accelerometers 4 are represented on each wing 11 of the aircraft AC. However, the device 1 can comprise a greater number of accelerometers 4, for accurately measuring the vibration modes, for example several tens of accelerometers.

In addition, in the embodiment of FIG. 1, the control surfaces 3 correspond to inner ailerons 10 of the wings 11 of the aircraft AC. Indeed, in this particular embodiment, these control surfaces 3 are adapted to generate the flutter mode targeted on the part 2, namely the wings 11. However, in other embodiments, the control surfaces 3 can correspond to other standard control surfaces of the aircraft AC. The control surfaces 3 are chosen as a function of the application considered. Indeed, they must be capable, by their deployment in a flight, of modifying the properties of the part 2 considered, in particular its aerodynamic damping characteristics, so as to obtain the appearance of the targeted flutter mode.

Furthermore, the device 1 comprises an avionics computer 5 configured to acquire and process the data measured by the accelerometers 4 in order to determine the control command for the control surfaces 3 of the aircraft AC. The avionics computer 5 is linked to the accelerometers 4 via a data transmission link, as represented schematically by the dashed lines in FIG. 1. Preferably, the avionics computer 5 corresponds to a standard flight management system of FMS (for "Flight Management System") type.

Figure 3:
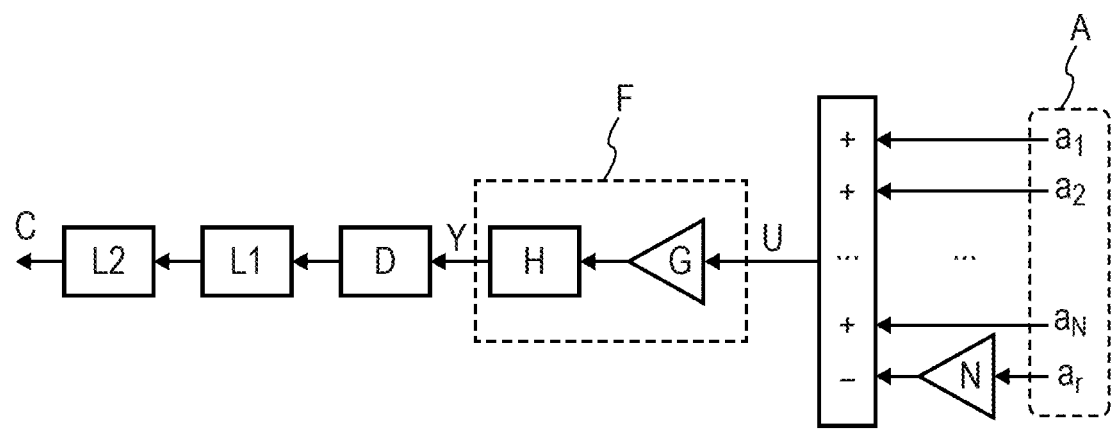
FIG. 3 is a functional diagram of a control law used by the device for generating a flutter effect of FIG. 1.

As represented schematically in FIG. 3, in a particular embodiment, the avionics computer 5 is configured to perform a series of data processing operations in order to obtain the control command (denoted C) for the control surfaces 3.

The avionics computer 5 performs, first of all, operations on the data measured by the accelerometers 4, called input data A, to obtain an input signal U. The avionics computer 5 is configured to calculate the input signal U by using the following equation:

$$U = \sum_{i=1}^{N}(a_i) - N.a_r \quad [\text{EQ. 1}]$$

in which:
N is the number of accelerometers 4 (without the accelerometer 4R);
$a_i$ is an acceleration measured by one of the accelerometers 4; and
$a_r$ is the rigid acceleration measured by the accelerometer 4R arranged on a rigid movement of the aircraft AC.

The avionics computer 5 therefore produces the sum of the accelerations $a_i$ measured by the accelerometers 4 by subtracting the rigid acceleration $a_r$, which makes it possible to have a reference acceleration so as not to take account of the overall movement of the aircraft AC in the measurement of the vibration modes on the part 2.

The avionics computer 5 then applies a control law to the input signal U to obtain an output signal Y. This control law takes the form of a transfer function F comprising a gain value G and a filtering chain H. The values of the gain G and of the parameters of the filtering chain H correspond to adjustable parameters that make it possible to adapt the control law as described hereinbelow.

The product of the input signal U and of the gain value G makes it possible to obtain a control command for displacing the control surfaces 3 in a way which modifies the vibration mode of the part 2 of the aircraft AC. Indeed, by displacing the control surfaces 3, the structural and aerodynamic properties of the aircraft AC (at least those of the part 2), and therefore its vibratory behavior, are modified. That causes the speed for which particular vibration modes appear, notably flutter modes, to be modified.

Indeed, through simulations based on aeroelastic models of the aircraft AC previously established, it is possible to identify the vibration modes of the part 2 as a function of the flight conditions of the aircraft AC, notably its speed. It is also possible to determine how to modify certain properties of the part 2, such as the damping, to modify the properties of the vibration mode obtained for a given speed. Knowing that, it is possible to determine how to displace the control surfaces 3 in order to modify said properties of the part 2, as desired. The deployment of the control surfaces 3 which is controlled by the control command is directly linked to the gain value G. Consequently, the choice of the gain value G makes it possible to determine the vibration mode obtained in the flight conditions considered.

Thus, by correctly choosing the gain value G, it is possible to generate a desired flutter mode at a given speed. The higher the gain value G (in absolute value), the greater the instability linked to the flutter and the more the speed of the aircraft AC for which said flutter appears decreases.

Moreover, the filtering chain H makes it possible to improve the effectiveness of the control law. For example, it can be configured to obtain a suitable synchronization between the deployment of the control surfaces 3 and the measurement frequency of the accelerometers 4. It can also be configured to obtain an amplification of the input signal U for the frequencies close to that corresponding to the flutter mode that is wanted to be generated. Conversely, it can also be configured to reduce the output signal Y for ranges of frequencies distant from that corresponding to the targeted flutter mode.

As a nonlimiting example, a function representing the filtering chain H can take the form of the following equation:

$$H(s) = \frac{s^2 + (f.2\pi.A_m.2.0, 7).s + (f.2\pi)^2}{s^2 + (f.2\pi.2.0, 7).s + (f.2\pi)^2} \quad [\text{EQ. 2}]$$

in which:
s is a variable;
f is the frequency of the flutter mode that is sought to be generated, in Hertz (Hz); and
$A_m$ is a predetermined amplification factor.

The output signal Y obtained at the output of the transfer function F corresponds to a raw control command which can be used to control the control surfaces 3 of the aircraft AC. However, in the embodiment of FIG. 3, the output signal Y is not used directly. Indeed, the avionics computer 5 is configured to perform data post-processing operations on the signal Y so as to refine it to obtain the final control command C that is effectively used to control the control surfaces 3. The data post-processing operations correspond to limitations denoted D, L1 and L2 in FIG. 3. In a nonlimiting manner, they can be a deployment amplitude limitation (L1), a deployment speed limitation (L2) and/or a delay (D).

Thus, the control command C used to control the control surfaces 3 can be adapted so as to avoid an excessive or excessively abrupt deployment of said control surfaces 3, which could be undesirable depending on the application considered, for example in terms of maneuverability of the aircraft AC. A delay, for its part, can make it possible to improve the synchronization between the deployment of the control surfaces 3 and the measurements taken by the accelerometers 4.

As a nonlimiting example, it is considered that the flutter mode that is wanted to be generated has a frequency f (value given in Hz) and that there is, without the application of a delay D, a phase shift of −40° between the input signal U obtained from the input data A and the output signal Y of the control law. In this case, a function representing a delay D making it possible to obtain a control command C in phase with the input signal U can take the form of the following equation:

$$D = \frac{40}{360.f} \quad [\text{EQ. 3}]$$

Moreover, as represented schematically in FIG. 1, the device 1 comprises a standard control system 6 configured to control the deployment of the control surfaces 3. The avionics computer 5 transmits the control command C to the control system 6. The latter is linked to the control surfaces 3 via a data transmission link, as represented schematically by dashed lines in FIG. 1, so as to be able to control them and generate the desired flutter mode.

Thus, by virtue of the device 1, it is possible to generate a flutter mode on the part 2 of the aircraft AC without needing to approach its critical speed. It is therefore possible to study the behavior of the aircraft AC when the latter is subjected to a flutter effect, and do so in controlled and safe conditions. Indeed, in the case of an undesirable event in the generation of the flutter, it is sufficient to deactivate the device 1 in order to almost instantaneously revert to a stable situation.

Moreover, as represented schematically in FIG. 1, the device 1 comprises an adjustment unit 7 comprising an interface making it possible to adjust the adjustable parameters of the control law. This interface is configured to allow a user to act on the adjustable parameters of the control law by modifying them in real time, namely during the use of the device 1. For example, this interface can comprise a screen and input means such as a keyboard or a touch screen.

The adjustment unit 7 makes it possible to modify, in real time, the flutter mode that is wanted to be generated on the part 2 of the aircraft AC, notably by acting on the gain value G. It can also make it possible to adjust the performance levels of the control law, notably by acting on the parameters of the filtering chain H.

The adjustment unit 7 can also make it possible to modify other adjustable parameters like the parameters of the limitations D, L1 and L2 applied in the data post-processing.

Furthermore, as represented schematically in FIG. 1, the device 1 comprises a monitoring unit 8 making it possible to monitor the behavior of the part 2 of the aircraft AC in the use of the device 1. The monitoring unit 8 is configured to record and monitor in real time the input data A measured by the accelerometers 4. For example, the avionics computer 5 can be configured to transmit said input data A to the monitoring unit 8 as and when said avionics computer 5 acquires them. The monitoring unit 8 stores the input data A thus received in a memory so as to be able to establish and use a log of the measurements.

In addition, the monitoring unit 8 is configured to compare the input data A transmitted by the avionics computer 5 to a table of predetermined threshold values not to be exceeded. If one or more input data A is or are greater than said corresponding predetermined threshold value in said table of predetermined threshold values, the monitoring unit 8 is configured to inhibit the deployment of the control surfaces 3, controlled by the control command C. In this case, the avionics computer 5 is configured to disregard the control command C and to reposition the control surfaces 3 in their original position.

Depending on the application considered, the monitoring unit 8 can be incorporated directly in the aircraft AC or be remote so as to perform remote tracking.

Thus, in the case where an abnormal or undesirable trend of the flutter mode obtained on the part 2 of the aircraft AC is detected, the monitoring unit 8 makes it possible to avoid any risk by guaranteeing a rapid return to a stable situation.

Figure 2:
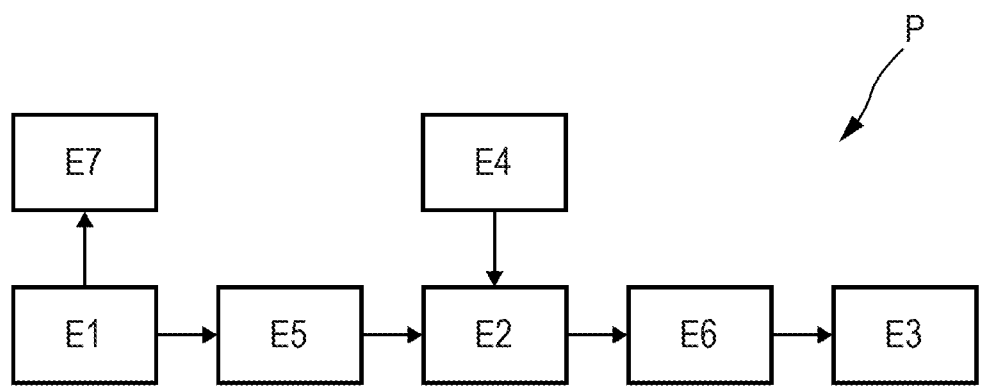
FIG. 2 is a block diagram of a method for generating a flutter effect according to a particular embodiment.

The device 1 described above is configured to implement a method P for generating a flutter effect. As represented schematically in FIG. 2 in a particular embodiment, the method P comprises the series of successive steps E1, E2, E3, E5 and E6, implemented by the device 1.

The step E1 is a measuring step, implemented by the accelerometers 4, for measuring the input data A.

The step E2 is a data processing step, implemented by the avionics computer 5, for determining the control command for the control surfaces 3 making it possible to generate the desired flutter mode on the part 2 of the aircraft AC. The data processing performed in the step E2 corresponds to the application of the control law to the input data A, as described above.

The steps E5 and E6 are, respectively, data preprocessing and post-processing steps implemented by the avionics computer 5. The step E5 is placed before the step E2 to calculate the input signal U of the control law from the input data A, as described above. The step E6, for its part, is implemented after the step E2 to apply the limitations D, L1 and L2 to the output signal Y.

The step E3 is a control step, implemented by the control system, for controlling the control surfaces 3 so as to generate the desired flutter mode by using the control command C transmitted by the avionics computer 5.

The steps of the method P are implemented repetitively, continuously, thus forming an active control loop. Indeed, the vibratory behavior of the part 2 makes it possible to determine a control command C which displaces the control surfaces 3. This deployment modifies the properties of the aircraft AC, which modifies the structural response of the part 2 which leads ultimately to a new vibratory behavior. The new vibratory behavior is measured by the accelerometers 4 which makes it possible to determine a new control command C for the control surfaces 3, and so on.

In this way, a coupling is obtained between the structural response of the part 2 and the control law which makes it possible to make the vibratory behavior of said part 2 change until the desired flutter mode is generated.

Furthermore, the method P comprises an adjustment step E4, implemented by the adjustment unit 7, for adjusting in real time the adjustable parameters of the control law. As detailed above, the step E4 makes it possible, notably, to target the flutter mode that is wanted to be generated and to adjust the performance levels of the control law.

Moreover, the method P comprises a monitoring step E7 implemented by the monitoring unit 8. The step E7 is implemented in parallel with the steps E1 to E6 to record the input data A measured by the accelerometers 4 and compare them to the threshold values that are not to be exceeded. If one of the input data A is greater than the corresponding threshold value (to which said input datum A is compared), the step E7 inhibits the deployment of the control surfaces 3 controlled by the control command determined in the step E2.

A preferred application of the device 1 relates to the study of the flutter effect on a test aircraft and the evaluation of the performance levels of a flutter suppression system on this same aircraft. The objective of this application is to verify the effectiveness of the flutter suppression system in real flight conditions.

In this exemplary application, it is considered that the design of the aircraft AC predisposes it to a flutter mode on the wings 11 for a certain critical speed. The appearance of this flutter mode is wanted to be avoided by putting in place the abovementioned flutter suppression system. That would make it possible to increase the range of speeds that can be used by the aircraft AC. Indeed, if the appearance of the undesirable flutter mode is prevented, the critical speed would be usable without risk for the aircraft AC.

The flutter suppression system is therefore put in place by a method, the subject of which does not form part of the present invention and which is not therefore explained in detail. In this example, it is considered that the wings 11 of the aircraft AC comprise outer ailerons 9 making it possible to influence the flutter mode that is wanted to be suppressed. The flutter suppression system is therefore configured to act on these outer ailerons 9 so as to counter the flutter mode to be suppressed.

In the context of this preferred application, there is a desire to check that the flutter suppression system is correctly configured by testing it in real conditions, without in any way having the aircraft AC be brought close to its critical speed. So, the device 1 is used to generate the abovementioned flutter mode on the wings 11 of the aircraft AC. To do this, the control surfaces 3 of the aircraft AC which make it possible to generate the desired flutter mode on the wings 11, other than the outer ailerons 9 (because they are already used by the flutter suppression system), have to be identified.

In this example, it is considered that the aircraft AC has other ailerons, for example inner ailerons 10, which can be used by the device 1 to generate the desired flutter mode. Consequently, the accelerometers 4 are arranged on the wings 11 in a suitable manner, in proximity to the inner ailerons 10. In addition, the control law of the device 1 is configured so as to determine a control command C for the inner ailerons 10. In this way, it is possible to generate the desired flutter mode on the wings 11.

One approach for obtaining a particular flutter mode can consist in proceeding in steps. The first step is to determine the theoretical gain value G that makes it possible to obtain a control command C which would generate the targeted flutter mode. Next, the control law is configured with a gain value G that is lower than that necessary, then this value is gradually increased until the targeted flutter mode is effectively generated.

Once the desired flutter mode is generated on the wings 11, the flutter suppression system is implemented by using the outer ailerons 9. In this way, it is possible to test the effectiveness of said flutter suppression system in controlled conditions. In addition, it is also possible to test its robustness and, if present, its self-adaptation algorithms. Indeed, by virtue of the adjustment unit 7, it is possible to adjust the control law during the test flight to make the characteristics of the flutter mode generated on the wings 11 vary. That can make it possible to evaluate the capabilities of the flutter suppression system to adapt to the variations in the flutter mode to be suppressed.

The device 1 making it possible to implement the method P as described above has numerous advantages. In particular:
  it makes it possible to generate a flutter effect on the aircraft AC in controlled conditions without needing to approach its critical speed;
  it makes it possible to generate a particular flutter mode which can be targeted by adjusting the adjustable parameters of the control law;
  it makes it possible to study the effectiveness and the robustness of a flutter suppression device for flutter modes exhibiting varied characteristics, and do so by simple modification of the adjustable parameters of the control law; and
  it is particularly safe since it makes it possible to easily and rapidly ensure a return to a stable situation in the case of an undesirable event.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a flutter effect on at least a part of an aircraft in flight, wherein the method comprises at least the following series of successive steps, implemented repetitively:
   a measuring step, implemented by a plurality of sensors arranged on the aircraft, for measuring input data;
   a data processing step, implemented by an avionics computer, for, based on the input data measured in the measuring step, determining at least one control command for at least one control surface of the aircraft, the at least one control command being determined by using a control law comprising at least one adjustable parameter corresponding to a gain value, the control law being configured to obtain the at least one control command so as to generate a flutter mode on at least a part of the aircraft; and
   a control step, implemented by a control system, for controlling the at least one control surface so as to generate said flutter mode by using the control command determined in the data processing step.

2. The method as claimed in claim 1, further comprising:
   an adjustment step, implemented by an adjustment unit, for adjusting the at least one adjustable parameter of the control law in real time, so as to obtain the at least one control command for the at least one control surface of the aircraft that generates a predetermined flutter mode.

3. The method as claimed in claim 1, further comprising:
   a data preprocessing step, implemented by the avionics computer before the data processing step, for calculating an input signal for the control law based on the input data acquired in the measuring step, by using the following equation:

$$U = \sum_{i=1}^{N}(a_i) - N.a_r$$

in which:
U is the input signal of the control law;
N is a number of sensors;
$a_i$ is an acceleration measured by one of said sensors; and
$a_r$ is an acceleration measured by one of said sensors configured to measure an acceleration linked to a rigid movement of the aircraft.

4. The method as claimed in claim 1, further comprising:
   a data post-processing step, implemented by the avionics computer after the data processing step, for applying, to the at least one control command determined by the control law, at least one limitation selected from a group consisting of: a deployment amplitude limitation, a deployment speed limitation, and a delay.

5. The method as claimed in claim 1, wherein the control law comprises at least one filtering chain.

6. The method as claimed in claim 1, further comprising:
   a monitoring step, implemented by a monitoring unit, for recording the input data measured by the plurality of sensors over time, for comparing said input data to predetermined threshold values, and, when at least one of said input data is greater than a corresponding predetermined threshold value, for inhibiting a deployment of the at least one control surface of the aircraft controlled by the at least one control command.

7. An aircraft comprising:
   a device for generating a flutter effect on at least a part of said aircraft, wherein the device comprises:
      a plurality of sensors arranged on the aircraft and configured to measure input data;
      an avionics computer arranged on the aircraft and configured to determine, based on said input data, at least one control command for at least one control surface of the aircraft, the at least one control command being determined by using a control law comprising at least one adjustable parameter corresponding to a gain value, the at least one control law being configured to obtain the at least one control command so as to generate a flutter mode on at least a part of the aircraft; and
      a control system configured to control the control surface of the aircraft so as to generate said flutter mode by using the at least one control command determined by the avionics computer.

8. The aircraft as claimed in claim 7, wherein the device further comprises an adjustment unit comprising an interactive interface configured to adjust the at least one adjustable parameter of the control law in real time, so as to obtain the at least one control command for the at least one control surface of the aircraft so as to generate a predetermined flutter mode.

9. The aircraft as claimed in claim 7, wherein the device further comprises a monitoring unit configured to record the input data measured by the plurality of sensors over time, to compare said input data to predetermined threshold values, and, when at least one of said input data is greater than a corresponding predetermined threshold value, to inhibit the deployment of the at least one control surface of the aircraft controlled by the at least one control command.

* * * * *